United States Patent
Liu et al.

(10) Patent No.: US 12,528,563 B2
(45) Date of Patent: Jan. 20, 2026

(54) DYNAMIC COMPENSATION METHOD FOR CURVED SURFACE DEFORMATION IN SHIP SEGMENTAL CONSTRUCTION

(71) Applicant: JIANGSU UNIVERSITY OF SCIENCE AND TECHNOLOGY, Jiangsu (CN)

(72) Inventors: Jinfeng Liu, Jiangsu (CN); Honggen Zhou, Jiangsu (CN); Xuwen Jing, Jiangsu (CN); Zhen Wang, Jiangsu (CN); Lei Li, Jiangsu (CN); Guizhong Tian, Jiangsu (CN); Chao Kang, Jiangsu (CN); Yu Chen, Jiangsu (CN); Guochao Li, Jiangsu (CN); Qiang He, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 1076 days.

(21) Appl. No.: 17/617,939

(22) PCT Filed: Apr. 2, 2021

(86) PCT No.: PCT/CN2021/085309
§ 371 (c)(1),
(2) Date: Dec. 10, 2021

(87) PCT Pub. No.: WO2021/213177
PCT Pub. Date: Oct. 28, 2021

(65) Prior Publication Data
US 2022/0315179 A1    Oct. 6, 2022

(30) Foreign Application Priority Data
Apr. 24, 2020  (CN) .......................... 202010329986.2

(51) Int. Cl.
*G06F 30/15* (2020.01)
*B63B 73/00* (2020.01)
*G06F 30/17* (2020.01)

(52) U.S. Cl.
CPC .............. *B63B 73/00* (2020.01); *G06F 30/15* (2020.01); *G06F 30/17* (2020.01)

(58) Field of Classification Search
CPC ......... B63B 73/00; G06F 30/15; G06F 30/17; G06F 30/12; G06F 2111/00; G06F 2119/22
See application file for complete search history.

(56) References Cited

FOREIGN PATENT DOCUMENTS

| CN | 103738463 | 4/2014 |
|----|-----------|--------|
| CN | 107284621 | 10/2017 |

(Continued)

OTHER PUBLICATIONS

C. Miao, S. Qi, "Research on hull configuration method of curve and surface based on NUBS" pp. 862-867, IEEE (Year: 2014).*

(Continued)

*Primary Examiner* — Kibrom K Gebresilassie
(74) *Attorney, Agent, or Firm* — JCIP GLOBAL INC.

(57) ABSTRACT

A dynamic compensation method for curved surface deformation in ship segmental construction includes fitting a curved surface and building a segmental deformation compensation model based on an acquired actual segmentation of a ship to obtain a theoretical height of a jig frame; establishing a correlation between jig frames based on a ship segmental deformation range and a compression load of the ship; and performing segmental deformation compensation according to an actual height and the theoretical height of the jig frame by adopting a preset adaptive regulation and control algorithm of jig frame height. According to the (Continued)

compensation method, a correlation between a reference jig frame and slave jig frames of each level is established.

7 Claims, 6 Drawing Sheets

(56) References Cited

FOREIGN PATENT DOCUMENTS

| CN | 108438141 | 8/2018 |
|----|-----------|--------|
| CN | 108725691 | 11/2018 |
| CN | 108891528 | 11/2018 |
| CN | 109050789 | 12/2018 |
| CN | 109733554 | 5/2019 |
| CN | 111516823 | 8/2020 |
| KR | 20140000174 | 1/2014 |
| KR | 20140004567 | 8/2014 |

OTHER PUBLICATIONS

A. Wen, S. M. Hj, Y. Samian, "Shipp Hull Fitting Using NRBS", 6 pgs., IEEE (Year: 2005).*

Q. K. Chen, X. Y. Li, "A 3D compensating Algorithm for LNG Shipbuilding Profiles Robot Cutting Systems", pp. 99-104 (Year: 2015).*

"International Search Report (Form PCT/ISA/210) of PCT/CN2021/085309", mailed on Jul. 8, 2021, with English translation thereof, pp. 1-5.

"Written Opinion of the International Searching Authority (Form PCT/ISA/237) of PCT/CN2021/085309", mailed on Jul. 8, 2021, pp. 1-4.

* cited by examiner (a)

(b)

(c)

DYNAMIC COMPENSATION METHOD FOR CURVED SURFACE DEFORMATION IN SHIP SEGMENTAL CONSTRUCTION

CROSS-REFERENCE TO RELATED APPLICATION

This application is a 371 of international application of PCT application serial no. PCT/CN2021/085309, filed on Apr. 2, 2021 which claims the priority benefit of China application no. 202010329986.2, filed on Apr. 24, 2020. The entirety of each of the above mentioned patent applications is hereby incorporated by reference herein and made a part of this specification.

TECHNICAL FIELD

The present invention relates to ship construction, and in particular to a dynamic compensation method for curved surface deformation in ship segmental construction.

DESCRIPTION OF RELATED ART

The jig frame for ship segmental construction developed from the template type, the support column type and the support point type in the early days to the numerical control jig frame, the flexible jig frame and the intelligent jig frame at present, with gradually improved functionality. However, for each type described above, the jig frames are independent, and there is no connection among the jig frames. In the ship segmental construction process, the segmental shape cannot be kept well as all jig frame needs to be adjusted and controlled in sequence. Segmental deformation compensation for the jig frames are facing problems such as subjectiveness and poor compensation variable accuracy.

Chinese publication application No. CN109050789A published on Dec. 21, 2018 discloses an intelligent jig frame and a method for supporting a ship with the intelligent jig frame, wherein all mechanical push rod devices work independently, and although each device is connected with a motor and a pressure sensor at the top of a working unit through a single-chip microcomputer, the external profile of a segmental curved surface cannot be well guaranteed.

Chinese publication application No. CN108725691A published on Nov. 2, 2018 discloses a movable ship jig frame, a ship jig frame control system and a control method thereof. However, this method needs to control each jig frame separately, so that no correlation is present between the jig frames, which results in complicated control steps and low efficiency.

Chinese publication application No. CN108438141A published on Feb. 6, 2018 discloses a method for automatically adjusting a support height of a shipbuilding jig frame and an adjustable jig frame. However, the method disclosed herein only completes the initial adjustment of the support height and is not suitable for repeated adjustment.

SUMMARY

Objective: The present application is intended to provide a dynamic compensation method for curved surface deformation in ship segmental construction, so as to solve the problem that systematic repeated adjustment cannot be performed due to no correlation among jig frames in existing control methods.

Technical Scheme: The present invention provides a dynamic compensation method for curved surface deformation in ship segmental construction, comprising the following steps.

(1) Fitting a curved surface and building a segmental deformation compensation model based on an acquired actual segmentation of a ship to obtain a theoretical height of a jig frame.

(2) Establishing a correlation between the jig frames based on a segmental deformation range and a compression load of the ship.

(3) Performing segmental deformation compensation according to an actual height and the theoretical height of the jig frame by adopting a preset adaptive regulation and control algorithm of jig frame height.

Furthermore, fitting a curved surface and building a segmental deformation compensation model based on an acquired actual segmentation of a ship comprises the following steps.

(11) Inversely calculating cubic curved surface control points according to acquired discrete points of a ship segmental outer plate.

(12) Calculating, based on the cubic curved surface control points, a curved surface fitting equation expressed as:

$$S(u, v) = \sum_{\varepsilon=0}^{m} \sum_{j=0}^{n} N_{\varepsilon,k}(u) N_{j,k}(v) V_{\varepsilon,j} \quad (0 \le u, v \le 1)$$

Wherein, k is 3, namely a cubic NURBS curved surface; u and v are formal parameters; m and n are the number of control points in the u and v directions, respectively, and u and v represent the horizontal and vertical directions of the curved surface, respectively; $V_{\varepsilon,j}$ ($\varepsilon=0, 1, \ldots, m$; $j=0, 1, \ldots, n$) is a control grid vertex, and $N_{\varepsilon,k}(u)$ and $N_{j,k}(v)$ are irrational B-spline basis functions.

(13) Based on the curved surface fitting equation, coordinates of contact points of a movable joint and the segmental outer plate, a lowest inclination angle of the movable joint and a thickness of the movable joint, performing coordinate transformation on the curved surface fitting equation by using a node insertion method to obtain a segmental deformation compensation model $Z_l$ expressed as:

$$Z_l = \sum_{\varepsilon=0}^{m} \sum_{j=0}^{n} N_{\varepsilon,3}\left(\overline{u}_{\varepsilon+k-1} + \frac{|p_x - p_{x\partial\partial}|}{\sum_{\varepsilon=1}^{m}|x_\varepsilon - x_{\varepsilon-1}|}\right) N_{j,3}\left(\overline{v}_{\varepsilon+k-1} + \frac{p_x - p_{x\partial\partial}}{\sum_{\varepsilon=1}^{n}|y_j - y_{j-1}|}\right) V_{\varepsilon,j} - L\cos\theta$$

Wherein, ($X_\vartheta$, $Y_\vartheta$) are plane coordinates of the jig frame, $\overline{u}_{\varepsilon+k-1}$, $\overline{v}_{\varepsilon+k-1}$ are parameterized values in intervals [$u_{\varepsilon+k-1}$, $u_{\varepsilon+k}$), [$v_{\varepsilon+k-1}$, $v_{\varepsilon+k}$) of original nodes u and v, respectively, $u_{\varepsilon+k}$, $v_{\varepsilon+k}$ represent values of original discrete points, $x_\varepsilon$ and $y_j$ represent coordinates $X_\vartheta$, $Y_\vartheta$ of $\varepsilon^{th}$ and $j^{th}$ discrete points, respectively, $p_{x\_prev}$ is a coordinate of a previous adjacent discrete point in the $X_\vartheta$ direction, and $p_{y\_prev}$ is a coordinate of a previous adjacent discrete point in the $Y_\vartheta$ direction; $\theta$ is the lowest inclination angle of the movable joint.

Furthermore, establishing a correlation between the jig frames based on a segmental deformation range and a compression load of the ship comprises as follows.

Determining a type of the correlation between the jig frames according to a preset type of the correlation.

Determining a number of jig frame levels and a number of jig frames of each level required by ship segmentation according to the determined type of the correlation and a jig frame load.

Furthermore, the preset type of the correlation comprises a serial connection and a parallel connection; in the serial connection, all the jig frames within the range of the segmental deformation and the load are arranged on the same track; in the parallel connection, all the jig frames within the range of the segmental deformation and the load are arranged on a plurality of different tracks.

Furthermore, the parallel connection comprises a star connection and an annular connection.

In the star connection, the reference jig frame is taken as a center, the jig frames arranged on two tracks symmetrically distributed from inside to outside relative to a track where the reference jig frame is positioned are of the same level, and the numbers of the jig frames of the same level on the two tracks are equal.

In the annular connection, the reference jig frame is taken as the center, and the levels are arranged around the reference jig frame sequentially from inside to outside.

Furthermore, the reference jig frame is a jig frame at the highest load or closest to the highest load during segmental deformation. The slave jig frames are jig frames of the levels, and realize dynamic response to the reference jig frame supported by a dynamic response method.

Furthermore, the number of the jig frame levels is determined by the following steps.

(21) Determining a preliminary number N of the jig frame levels in a deformation area by observing the number of the jig frames in the deformation area.

(22) Obtaining an actual total pressure of the jig frames of level a through a pressure sensor, wherein a is a serial number of the level and is a positive integer.

(23) Judging whether the total pressure of the jig frames of level a is greater than 70% of total pressure of the jig frames of level a−1 or not.

If not, accumulating the level serial number a once, and returning to the step (22).

If yes, then:
if a is ≥N, determining the final number of the jig frame levels in the deformation area as a; and
if a is <N, accumulating the level serial number a once, and returning to the step (23).

Furthermore, the number of the jig frames of each level is determined by the following steps.

When in the serial connection: with the number of the jig frame levels being 1, determining the number of the slave jig frames as the number of the jig frames on the current track in the segmental deformation area.

When in the star connection:
determining the number of original jig frames of the current level and the number of jig frames outside the deformation area to obtain the number of jig frames of the current level on each track; and
determining a final number and positions of the jig frames of the current level according to a preset distance threshold value between the current level and the reference jig frame.

When in the annular connection:
determining a number of original jig frames of the current level, and judging whether a plurality of the jig frames of the current level exist on the same track or not: if not, determining the number of the jig frames of the current level as the number of the original jig frames.

If yes, classifying redundant jig frames on the same track into the next level according to the principle that jig frames with greatest included angle are kept on the track, and thus obtaining the number and positions of the jig frames of each level by analogy.

Furthermore, performing segmental deformation compensation by adopting the preset adaptive regulation and control algorithm comprises the following steps.

(31) Determining a pressure of the reference jig frame according to the total number of the jig frames in the deformation area and anti-deformation force.

(32) Determining an actual height of the reference jig frame based on the preset adaptive regulation and control algorithm; and obtaining a theoretical height of the reference jig frame based on the segmental deformation compensation model $Z_l$.

(33) Generating dynamic compensation pulse signals according to the pressure, the actual height and the theoretical height of the reference jig frame, and sending the dynamic compensation pulse signals by a stepping motor.

(34) Transmitting the dynamic compensation pulse signals to the slave jig frames of each level sequentially to obtain a dynamic compensation amount of each slave jig frame for dynamic compensation.

(35) If the pressure of the compensated reference jig frame is within a preset pressure range, ending the dynamic response.

Otherwise, returning to the step (33) to continue the dynamic compensation.

Furthermore, the preset adaptive regulation and control algorithm is a combination of a fuzzy control algorithm and a PID control algorithm and comprises as follows.

Taking errors of a compression load and a theoretical load of the reference jig frame and error change rates as input variables, and taking the actual height of the reference jig frame as an output variable; and performing parameter setting on proportionality factors $K_p$, $K_i$ and $K_d$ through the processes of fuzzification, fuzzy reasoning and defuzzification, and realizing adaptive control through PID control.

Beneficial Effects: Compared with the prior art, the compensation method for curved surface deformation in ship segmental construction disclosed herein establishes a correlation between a reference jig frame and slave jig frames of each level, such that other slave jig frames can be automatically adjusted according to the change of the reference jig frame during compensation, which improves the deformation compensation precision and efficiency and segmental construction quality. In addition, the method disclosed herein can effectively avoid the defect that the existing deformation compensation methods are easy to change and difficult to check, and can automatically adjust dynamic compensation.

DESCRIPTION OF THE EMBODIMENTS

The present invention will be further described below with reference to the drawings and embodiments.

Figure 1:
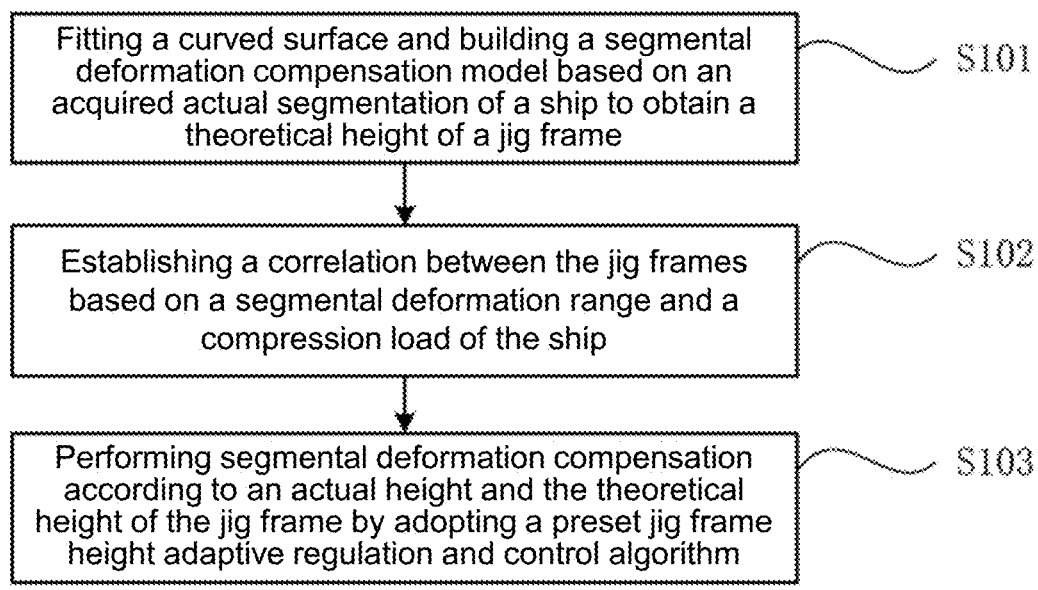
FIG. 1 is a flowchart of the compensation method for curved surface deformation in ship segmental construction according to the present application.

The present invention provides a dynamic compensation method for curved surface deformation in ship segmental construction, as shown in FIG. 1, the method comprising the following steps.

S101, fitting a curved surface and building a segmental deformation compensation model based on an acquired actual segmentation of a ship to obtain a theoretical height of a jig frame.

Specifically, fitting a curved surface and building a segmental deformation compensation model based on an acquired actual segmentation of a ship comprises the following steps.

(11) Inversely calculating cubic curved surface control points according to acquired discrete points of a ship segmental outer plate. Specifically, the discrete points of a ship segmental outer plate can be acquired by a total station or a three-dimensionally scanner for data acquisition.

(12) Calculating, based on the cubic curved surface control points, a curved surface fitting equation of jig frame height coordinates expressed as:

$$S(u, v) = \sum_{\varepsilon=0}^{m} \sum_{j=0}^{n} N_{\varepsilon,k}(u) N_{j,k}(v) V_{\varepsilon,j} \quad (0 \le u, v \le 1)$$

Wherein, k is 3, namely a cubic NURBS curved surface; u and v are formal parameters; m and n are the number of control points in the u and v directions, u and v represent the horizontal and vertical directions of the curved surface, respectively; $V_{\varepsilon,j}$ ($\varepsilon=0, 1, \ldots, m; j=0, 1, \ldots, n$) is a control grid vertex, and $N_{\varepsilon,k}(u)$ and $N_{j,k}(v)$ are irrational B-spline basis functions.

(13) Based on the curved surface fitting equation, coordinates of contact points of a movable joint and the segmental outer plate, a lowest inclination angle of the movable joint and a thickness of the movable joint, performing coordinate transformation on the curved surface fitting equation by using a node insertion method to obtain a segmental deformation compensation model Zl.

Specifically, assuming that the plane coordinates of the jig frame are ($X_\vartheta$, $Y_\vartheta$), when calculating the height coordinates S(u,v), the coordinate points ($X_\vartheta$, $Y_\vartheta$) cannot be introduced directly, thus requiring parameterization of the coordinates. Coordinate transformation is performed by node insertion:

$$u = \overline{u}_{\varepsilon+k-1} + \frac{|X_\vartheta - p_{x\vartheta\vartheta}|}{\sum_{\varepsilon=1}^{m}|x_\varepsilon - x_{\varepsilon-1}|} \qquad p_{x\,prev}$$

$$v = \overline{v}_{\varepsilon+k-1} + \frac{|Y_\vartheta - p_{y\vartheta\vartheta}|}{\sum_{j=1}^{n}|y_j - y_{j-1}|} \qquad p_{y\,prev}$$

Wherein, $\overline{u}_{\varepsilon+k-1}$, $\overline{v}_{\varepsilon+k-1}$ are parameterized values in intervals [$u_{\varepsilon+k-1}$, $u_{\varepsilon+k}$), [$v_{\varepsilon+k-1}$, $v_{\varepsilon+k}$) of original nodes u and v, respectively, $u_{\varepsilon+k}$, $v_{\varepsilon+k}$ represent values of original discrete points, x and $y_j$ represent plane coordinates $X_\vartheta$, $Y_\vartheta$ of $\varepsilon^{th}$ and $j^{th}$ discrete points, respectively, $p_{x\,prev}$ is a coordinate of a previous adjacent di rete point in the $X_\vartheta$ direction, and $p_{y\,prev}$ is a coordinate of a previous adjacent discrete point in the $Y_\vartheta$ direction.

Therefore, S(u, v) is transformed into:

$$S(X_\vartheta, Y_\vartheta) = \sum_{\varepsilon=0}^{m}\sum_{j=0}^{n} N_{\varepsilon,3}\left(\overline{u}_{\varepsilon+k-1} + \frac{|X_\vartheta - pp_{x\,prev}|}{\sum_{\varepsilon=1}^{m}|x_\varepsilon - x_{i-1}|}\right) N_{j,3}\left(\overline{v}_{\varepsilon+k-1} + \frac{|Y_\vartheta - pp_{y\,prev}|}{\sum_{j=1}^{n}|y_j - y_{j-1}|}\right) V_{\varepsilon,j}$$

Assuming that the coordinates of the contact points of the movable joint and the segmental outer plate are ($X_t$, $Y_t$, $Z_t$), that the lowest inclination angle of the movable joint is θ, and that the thickness of the movable joint is L, $X_t = X_\vartheta + L \sin θ$, $Y_t = Y_\vartheta$, and a mathematical model of the position coordinates of the contact points of the ship segmental outer plate and the movable joint is given by the equation described above, which is expressed as:

$$(X_t, Y_t, Z_t) = \left\{ X_\vartheta + L\sin\theta, Y_\vartheta, \right.$$

$$\sum_{\varepsilon=0}^{m}\sum_{j=0}^{n} N_{\varepsilon,3}\left(\overline{u}_{\varepsilon+k-1} + \frac{|X_\vartheta - p_{x\,prev_1}|}{\sum_{\varepsilon=1}^{m}|x_\varepsilon - x_{\varepsilon-1}|}\right) N_{j,3}\left(\overline{v}_{\varepsilon+k-1} + \frac{|Y_\vartheta - p_{x\,prev}|}{\sum_{\varepsilon=1}^{n}|y_j - y_{j-1}|}\right) V_{\varepsilon,j}$$

Assuming that coordinates of supporting points of the jig frame are ($X_l$, $Y_l$, $Z_l$)=($X_\vartheta$, $Y_\vartheta$, $Z_t - L\cos θ$), the height coordinate of the jig frame is $Z_l$, that is, the segmental deformation compensation model is specifically expressed as:

$$Z_l = \sum_{\varepsilon=0}^{m}\sum_{j=0}^{n} N_{\varepsilon,3}\left(\overline{u}_{\varepsilon+k-1} + \frac{p_{x\,prev} - p_{x\vartheta\vartheta}}{\sum_{\varepsilon=1}^{m}|x_\varepsilon - x_{\varepsilon-1}|}\right) N_{j,3}\left(\overline{v}_{\varepsilon+k-1} + \frac{p_{x\,prev} - p_{x\vartheta\vartheta}}{\sum_{\varepsilon=1}^{n}|y_j - y_{j-1}|}\right) V_{\varepsilon,j} -$$

$$L\cos\theta$$

S102, establishing a correlation between the jig frames based on a segmental deformation range and a compression load of the ship.

Specifically, establishing a correlation between the jig frames based on a segmental deformation range and a compression load of the ship comprises as follows.

1. Determining a type of the correlation between the jig frames according to a preset type of the correlation.

Firstly, the reference jig and the slave jig frames are pre-defined: the reference jig frame is a center jig frame, namely a jig frame at the highest load or closest to the highest load during segmental deformation. The slave jig frames are jig frames of the levels, and realize dynamic response to the reference jig frame supported by a dynamic response method.

Figure 2:
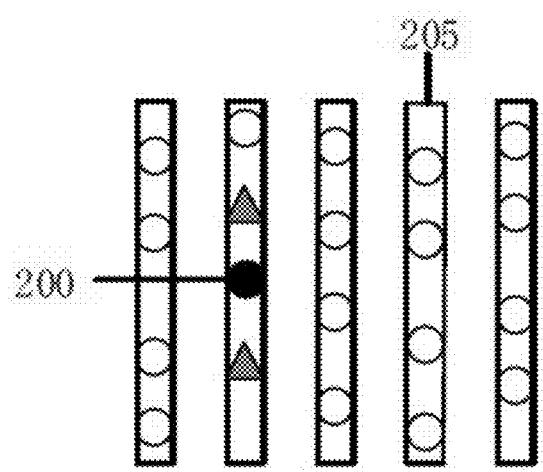
FIG. 2 is a schematic diagram of the classification of association types of jig frames in the method according to the present application.
Figure 2:
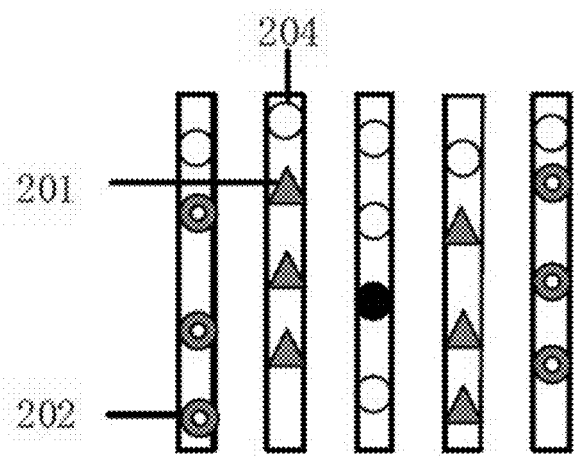
Figure 2:
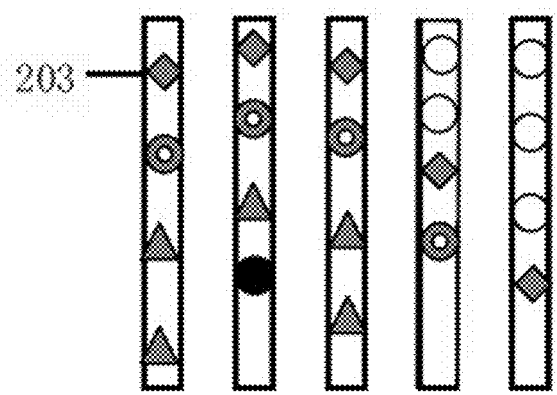

As shown in FIG. 2, the solid circle-identified jig frame is the reference jig frame 200, the triangle-identified jig frames are slave jig frames 201 of level one, the hollow circle-identified jig frames are slave jig frames 202 of level two, the diamond-identified jig frames are slave jig frames 203 of level three, and the rest jig frames 204 are identified by unfilled circle. All the jig frames are distributed on a track 205.

The preset type of the correlation comprises a serial connection and a parallel connection. In the serial connection, as shown in (a) of FIG. 2, all the jig frames within the range of the segmental deformation and the load are arranged on the same track. In the parallel connection, as shown in (b) and (c) of FIG. 2, all the jig frames within the range of the segmental deformation and the load are arranged on a plurality of different tracks. The parallel connection comprises star connection and annular connection. The connection type of (b) of FIG. 2 is the star connection, and the connection type of (c) of FIG. 2 is the annular connection. In the star connection, the reference jig frame is taken as a center, the jig frames arranged on two tracks symmetrically distributed from inside to outside relative to a track where the reference jig frame is positioned are of the same level, and the numbers of the jig frames of the same level on the two tracks are equal. In the annular connection, the reference jig frame is taken as the center, and the levels are arranged around the reference jig frame sequentially from inside to outside.

2. Determining a number of jig frame levels and a number of jig frames of each level required by ship segmentation according to the determined type of the correlation and a jig frame load.

Figure 3:
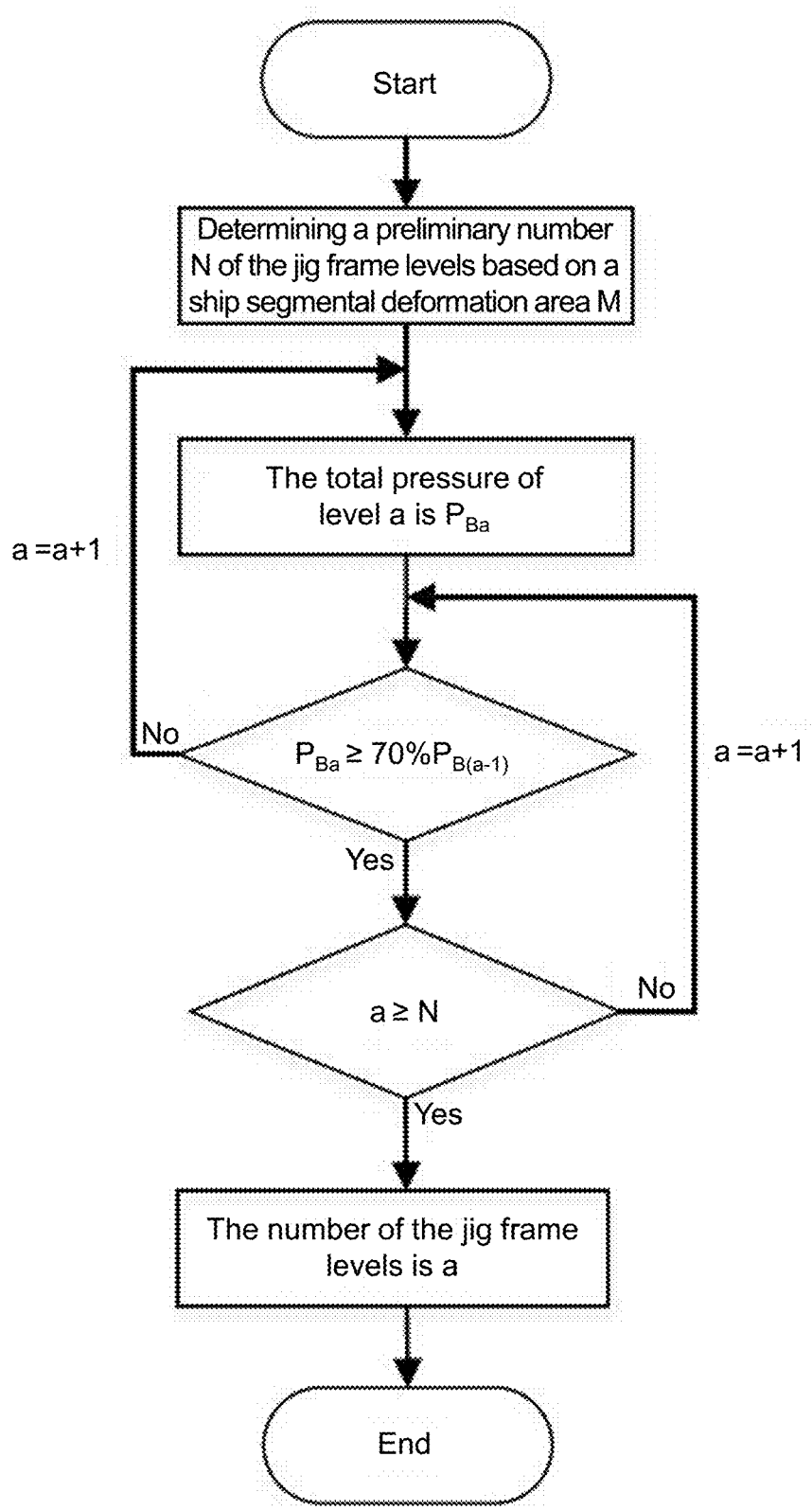
FIG. 3 is a flowchart of the method for determining the number of compensated jig frame levels according to the present application.

Specifically, as shown in FIG. 3, the number of the jig frame levels is determined by the following steps.

(21) Determining a preliminary number N of the jig frame levels in a deformation area by observing the number of the jig frames in the deformation area M.

(22) Obtaining an actual total pressure of the jig frames of level a through a pressure sensor, wherein a is a serial number of the level and is a positive integer.

(23) Judging whether the total pressure of the jig frames of level a is greater than 70% of total pressure of the jig frames of level a−1 or not, namely whether $P_{Ba} \geq 70\% P_{B(a-1)}$ is satisfied or not.

If not, accumulating the level serial number a once, and returning to the step (22).

If yes, then:

If a is ≥N, determining the final number of the jig frame levels in the deformation area as a.

If a is <N, accumulating the level serial number a once, and returning to the step (23).

In the steps described above, when $P_{Ba}$ is ≥70% $P_{B(a-1)}$, the excessive pressure of the jig frames of level a is borne by the jig frames of the upper level, i.e., level a−1. Thus, the jig frames of all the levels jointly form an associated jig frame system.

Figure 4:
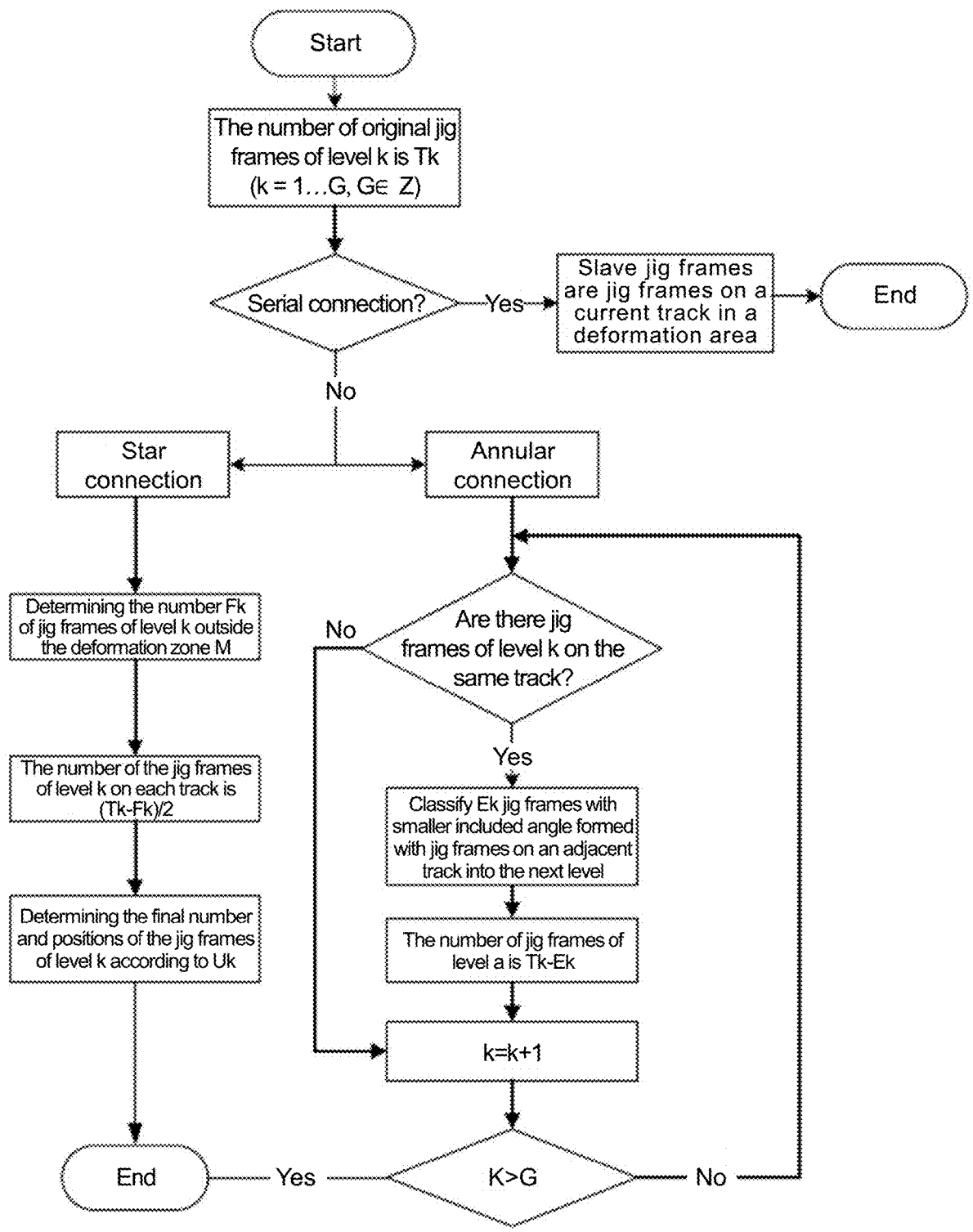
FIG. 4 is a flowchart of the method for determining the number and positions of the slave jig frames of each level according to the present application.

As shown in FIG. 4, the number of the jig frames of each level is determined by the following steps.

It can be detected that the number of original jig frames of level k is Tk, wherein k is a level serial number, k=1 . . . G. G is the number of the jig frame levels finally determined according to the method of FIG. 3, and G∈Z.

When in the serial connection, with the number of the jig frame levels being 1, the number of the slave jig frames is determined as the number of the jig frames on the current track in the segmental deformation area.

When in the star connection, the number of original jig frames of the current level k and the number of jig frames outside the deformation area M are determined to obtain the number of jig frames (Tk−Fk)/2 of the current level k on each track.

According to a preset distance threshold value Uk between level k and the reference jig frame, the jig frames of level k on each of two symmetrically distributed tracks having a distance to the reference jig frame smaller than Uk are slave jig frames of level k, and thus the final number and positions of the jig frames of the current level are determined.

When in the annular connection:

The number of original jig frames of level k is determined, and whether a plurality of the jig frames of level k exist on the same track or not is judged: if not, the number of the jig frames of level k is determined as the number of the original jig frames, and the method proceeds to the judgment of the next level.

If yes, redundant jig frames on the same track are classified into the next level according to the principle that jig frames with greatest included angle are kept on the track. For example, the reference jig frame is recorded as H, for jig frames of the same level on two adjacent tracks, 1 jig frames is arranged on the left track and recorded as Z, and 2 jig frames are arranged on the right track and recorded as B and Q, respectively. An angle formed by B and the reference jig frame H and Z and an angle formed by Q and the reference jig frame H and Z are measured. If ∠BHZ is larger than ∠QHZ, the jig frame B is classified into level k, and the jig frame Q is classified into level k+1. Otherwise, the jig frame Q is classified into level k, and the jig frame B is classified into level k+1. By analogy until k is >G, the number and positions of the jig frames of each level can be obtained.

S103, performing segmental deformation compensation according to an actual height and the theoretical height of the jig frame by adopting a preset adaptive regulation and control algorithm of jig frame height.

Figure 6:
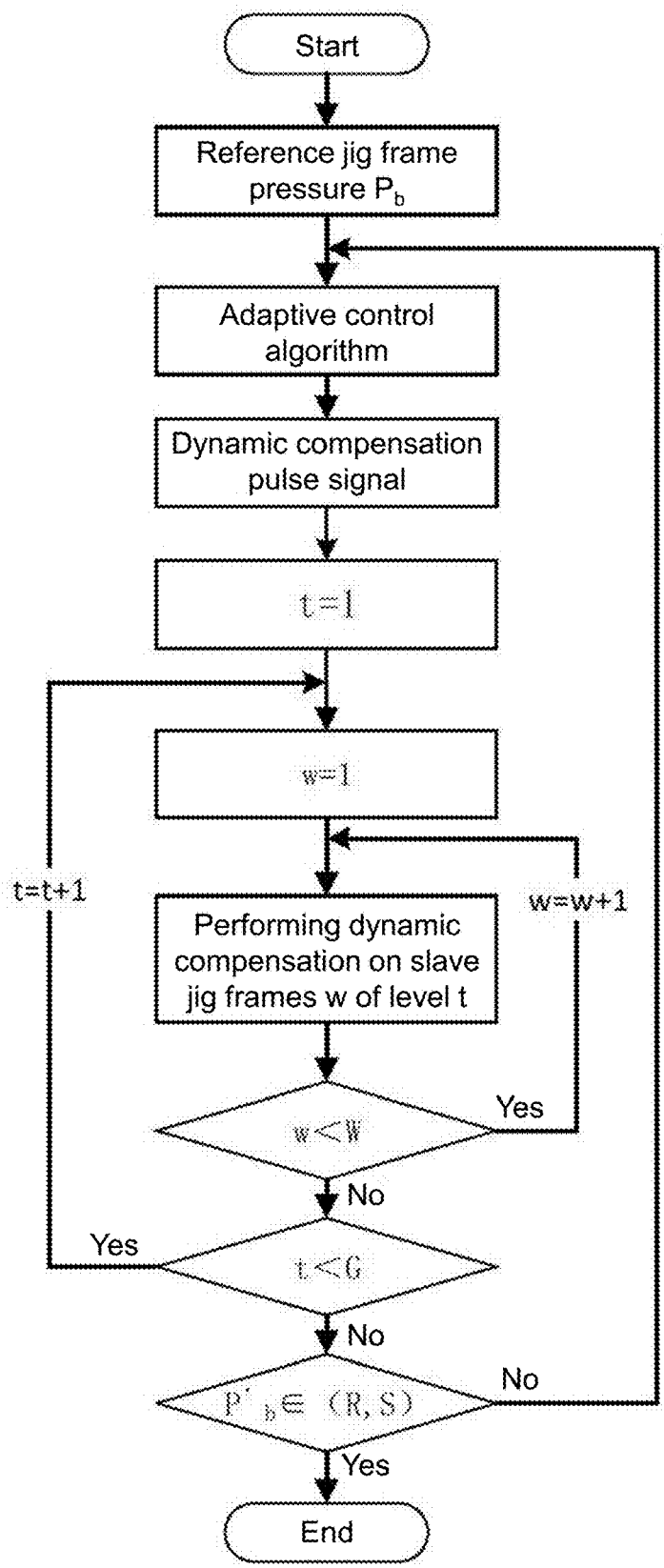
FIG. 6 is a flowchart of the dynamic response of associated jig frames in the method according to the present application.

Specifically, the steps of segmental deformation compensation, as shown in FIG. 6, comprise.

(31) Determining a pressure of the reference jig frame according to the total number of the jig frames in the deformation area and anti-deformation force. The determination method comprises: obtaining a total number of the jig frames T in the deformation area according to the algorithm for the number and positions of the jig frames of each level, calculating an inverse deformation force $P_M$ according to an inverse deformation method in a ship segmental deformation correction method, and determining the reference jig frame in the deformation area and the pressure thereof $P_b(P_b - P_M/T)$.

(32) Determining an actual height U of the reference jig frame based on the preset adaptive regulation and control algorithm, and obtaining a theoretical height $Z_l$ of the reference jig frame based on the segmental deformation compensation model $Z_l$.

Figure 5:
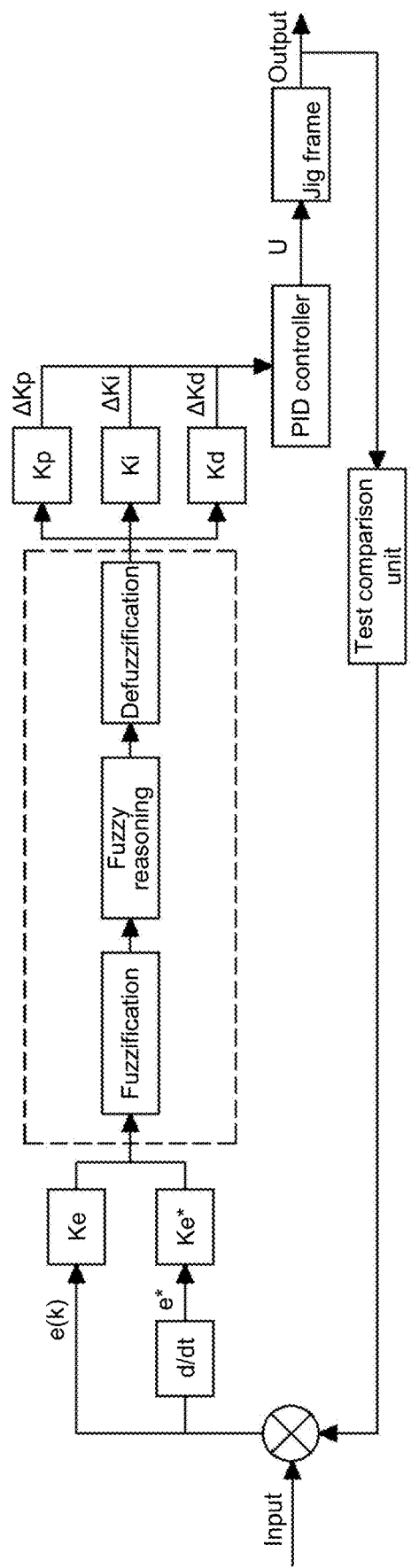
FIG. 5 is a flowchart of the adaptive control algorithm in the method according to the present application.

The preset jig frame height adaptive regulation and control algorithm comprises a fuzzy control algorithm and a PID control algorithm. As shown in FIG. 5, errors of a compression load and a theoretical load of the reference jig frame and error change rates are taken as input variables, and the actual height of the reference jig frame are taken as an output variable. Fuzzy control performs the parameter setting on the proportionality factor $K_p$, integral factor $K_i$ and differential factor $K_d$ through three processes of fuzzification, fuzzy reasoning and defuzzification, and realizing adaptive control through PID control, thereby realizing segmental dynamic compensation for curved surface.

In the accurate variable fuzzification process, input variables are the errors e of the compression load and the theoretical load of the reference jig frame and the error change rates e*, and the output variable U is the height of the reference jig frame. The fuzzy control rule is a fuzzy control statement in the form "if e and e* then U", i.e., if e and e* exist, then U exists. A variation range, a quantization factor and a quantization grade of each of the input variables and the output variable are calculated according to the input and output variables of a controller. Then, each input and output linguistic variable, when defining a fuzzy subset and determining the fuzzy control rule, is required to be within a specified quantization domain. And finally, to each input variable, a corresponding output value is obtained. According to setting requirements of controlled parameters for $\Delta K_p$, $\Delta K_i$ and $\Delta K_d$ based on the state of a controlled object, different deviations e and deviation change rates e*, the control rule of $K_p$, $K_i$ and $K_d$ is finally obtained. Defuzzification is performed by a selected weighted average method to obtain an accurate value of the output variable subjected to defuzzification, and parameter values of $K_p$, $K_i$ and $K_d$ under different deviations e and deviation change rates e* can be calculated.

(33) Generating dynamic compensation pulse signals according to the pressure $P_b$, the actual height U and the theoretical height $Z_l$ of the reference jig frame, and sending the dynamic compensation pulse signals by a stepping motor.

(34) Transmitting the dynamic compensation pulse signals to the slave jig frames of each level sequentially as dynamic adjustment instructions to obtain a dynamic compensation amount of each slave jig frame for dynamic compensation. In the figure, t is a number of the current level, G is a determined level number, w is a number of the slave jig frames of level t, and W is a number of the slave jig frames of level t.

(35) If the pressure $P_b'$ of the compensated reference jig frame is within a preset pressure range, ending the dynamic response.

Otherwise, returning to the step (33) to continue the dynamic compensation.

It should be appreciated by those skilled in the art, the embodiments of the present application may be provided as a method, a system, or a computer program product. Accordingly, the present application may take the form of an entirely hardware embodiment, an entirely software embodiment or an embodiment combining software and hardware. Furthermore, the present application may take the form of a computer program product embodied on one or more computer-usable storage media (including, but not limited to, disk storage, CD-ROM and optical storage) having computer-usable program codes.

The present application is described with reference to flowcharts and/or block diagrams of methods, apparatus (systems), and computer program products according to the embodiments of the present application. It shall be understood that each of the procedures and/or blocks of the flowcharts and/or block diagrams and combinations of the procedures and/or blocks of the flowcharts and/or block diagrams can be implemented by computer program instructions. These computer program instructions may be provided to a processor of a general purpose computer, a special purpose computer, an embedded processor or other programmable data processing apparatuses to produce a machine, such that the instructions, which are executed by the processor of the computer or other programmable data processing apparatuses, produce a device for implementing the functions specified in one or more procedures of the flowcharts and/or one or more blocks of the block diagrams.

These computer program instructions may also be stored in a computer-readable memory capable of directing a computer or other programmable data processing apparatuses to function in a particular manner, such that the instructions stored in this computer-readable memory produce an article of manufacture comprising an instruction device which implement the functions specified in one or more procedures of the flowcharts and/or one or more blocks of the block diagrams.

These computer program instructions may also be loaded onto a computer or other programmable data processing apparatuses to enable a series of procedures to be implemented on the computer or other programmable apparatuses to produce a computer implemented process, such that the instructions, which are executed on the computer or other programmable apparatuses, provide steps for implementing the functions specified in one or more procedures of the flowcharts and/or one or more blocks of the block diagrams.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dynamic compensation method for curved surface deformation in ship segmental construction, the method comprising the following steps:

step (1): fitting a curved surface and building a segmental deformation compensation model based on an acquired actual segmentation of a ship to obtain a theoretical height of a jig frame;

wherein the step (1) comprises the following steps:

step (11): inversely calculating cubic curved surface control points according to acquired discrete points of a ship segmental outer plate;

step (12): calculating, based on the cubic curved surface control points, a curved surface fitting equation expressed as:

$$S(u, v) = \sum_{\varepsilon=0}^{m} \sum_{j=0}^{n} N_{\varepsilon,k}(u) N_{j,k}(v) V_{\varepsilon,j} \quad (0 \le u, v \le 1)$$

wherein k is 3, which is a cubic NURBS curved surface; u and v are formal parameters; m and n are a number of control points in the u and v directions, respectively, and u and v represent horizontal and vertical directions of the curved surface, respectively; $V_{\varepsilon,j}$ ($\varepsilon=0, 1, \ldots, m$; $j=0, 1, \ldots, n$) is a control grid vertex, and $N_{\varepsilon,k}(u)$ and $N_{j,k}(v)$ are irrational B-spline basis functions; and step (13): based on the curved surface fitting equation, coordinates of contact points of a movable joint and the segmental outer plate, a lowest inclination angle of the movable joint and a thickness L of the movable joint, performing coordinate transformation on the curved surface fitting equation by using a node insertion method to obtain a segmental deformation compensation model $Z_l$ expressed as:

$$Z_l = \sum_{\varepsilon=0}^{m}\sum_{j=0}^{n} N_{\varepsilon,3}\left(\overline{u}_{\varepsilon+k-1} + \frac{|X_\theta - p_{x\theta\theta}|p_x}{\sum_{\varepsilon=1}^{m}|x_\varepsilon - x_{\varepsilon-1}|}\right)N_{j,3}\left(\overline{v}_{\varepsilon+k-1} + \frac{|Y_\theta - p_{x\theta\theta}|p_x}{\sum_{\varepsilon=1}^{n}|y_j - y_{j-1}|}\right)V_{\varepsilon,j} - Lcos\theta$$

wherein $(X_\theta, Y_\theta)$ are plane coordinates of the jig frame, $\overline{u}_{\varepsilon+k-1}$, $\overline{v}_{\varepsilon+k-1}$ are parameterized values in intervals $[u_{\varepsilon+k-1}, u_{\varepsilon+k})$ and $[v_{\varepsilon+k-1}, v_{\varepsilon+k})$ of original nodes u and v, respectively, $u_{\varepsilon+k}$ and $v_{\varepsilon+k}$ represent values of original discrete points, $x_\varepsilon$ and $y_j$ represent coordinates $X_\theta$, $Y_\theta$ of $\varepsilon^{th}$ and $j^{th}$ discrete points, respectively, $p_{x\_prev}$ is a coordinate of a previous adjacent discrete point in an $X_\theta$ direction, and $p_{y\_prev}$ is a coordinate of a previous adjacent discrete point in an $X_\theta$ direction; and $\theta$ is the lowest inclination angle of the movable joint, step (2): establishing a correlation between the jig frames to define a reference jig frame and a plurality of slave jig frames based on a segmental deformation range and a compression load of the ship; and wherein the step (2) comprises:
  determining a type of the correlation between the jig frames according to a preset type of the correlation; and
  determining a number of jig frame levels and a number of jig frames of each level required by ship segmentation according to the determined type of the correlation and a jig frame load, step (3): performing segmental deformation compensation according to an actual height and the theoretical height of the reference jig frame by adopting a preset jig frame height adaptive regulation and control algorithm, wherein the step (3) comprises:
  step (31): determining a pressure of the reference jig frame according to a total number of the jig frames in the deformation area and anti-deformation force;
  step (32): determining the actual height of the reference jig frame based on the preset adaptive regulation and control algorithm; and obtaining the theoretical height of the reference jig frame based on the segmental deformation compensation model $Z_l$;
  step (33): generating dynamic compensation pulse signals according to the pressure, the actual height and the theoretical height of the reference jig frame, and sending the dynamic compensation pulse signals by a stepping motor;
  step (34): transmitting the dynamic compensation pulse signals to the slave jig frames of each level sequentially to obtain a dynamic compensation amount of each slave jig frame for dynamic compensation; and
  step (35): if the pressure of the compensated reference jig frame is within a preset pressure range, ending the dynamic response; otherwise, returning to the step (33) to continue the dynamic compensation.

2. The method according to claim 1, wherein the preset type of the correlation comprises a serial connection and a parallel connection; in the serial connection, all the jig frames within the segmental deformation range and a range of the compression load are arranged on a same track; in the parallel connection, all the jig frames within the segmental deformation range and the range of the load are arranged on a plurality of different tracks.

3. The method according to claim 2, wherein the parallel connection comprises a star connection and an annular connection;
  in the star connection, the reference jig frame is taken as a center, the jig frames arranged on two tracks symmetrically distributed from inside to outside relative to a track where the reference jig frame is positioned are of a same level, and the numbers of the jig frames of the same level on the two tracks are equal;
  in the annular connection, the reference jig frame is taken as the center, and the levels are arranged around the reference jig frame sequentially from inside to outside.

4. The method according to claim 3, wherein the reference jig frame is a jig frame at a highest load or closest to the highest load during segmental deformation; the slave jig frames are the jig frames of the levels, and realize dynamic response to the reference jig frame supported by a dynamic response method.

5. The method according to claim 4, wherein the number of the jig frame levels is determined by the following steps:
  step (21): determining a preliminary number N of the jig frame levels in a deformation area by observing the number of the jig frames in the deformation area;
  step (22): obtaining an actual total pressure of the jig frames of level a through a pressure sensor, wherein a is a level serial number and is a positive integer; and
  step (23): judging whether the total pressure of the jig frames of level a is greater than 70% of a total pressure of the jig frames of level a−1 or not:
    if not, accumulating the level serial number a once, and returning to the step (22); and
    if yes, then:
      if a is ≥N, determining a final number of the jig frame levels in the deformation area as a; and
      if a is <N, accumulating the level serial number a once, and returning to the step (23).

6. The method according to claim 5, wherein the number of the jig frames of each level is determined by the following steps:
  when in the serial connection, with the number of the jig frame levels being 1, determining a number of the slave jig frames as the number of the jig frames on a current track in the segmental deformation area;
  when in the star connection,
    determining the number of original jig frames of a current level and the number of jig frames outside the deformation area to obtain the number of jig frames of the current level on each track; and
    determining a final number and positions of the jig frames of the current level according to a preset distance threshold value between the current level and the reference jig frame; and
  when in the annular connection,
    determining a number of original jig frames of the current level, and judging whether a plurality of the jig frames of the current level exist on the same track or not: if not, determining the number of the jig frames of the current level as the number of the original jig frames; and if yes, classifying redundant jig frames on the same track into a next level according to a principle that jig frames with greatest included angle are kept on the track, and thus obtaining the number and positions of the jig frames of each level by analogy.

7. The method according to claim 6, wherein the preset adaptive regulation and control algorithm is a combination of a fuzzy control algorithm and a proportional integral derivative (PID) control algorithm and comprises:
taking errors of a compression load and a theoretical load of the reference jig frame and error change rates as input variables, and taking the actual height of the reference jig frame as an output variable; and performing parameter setting on proportionality factors $K_p$, $K_i$ and $K_d$ through processes of fuzzification, fuzzy reasoning and defuzzification, and realizing adaptive control through PID control.

\* \* \* \* \*